(12) United States Patent
Morgan et al.

(10) Patent No.: US 7,668,816 B2
(45) Date of Patent: Feb. 23, 2010

(54) DYNAMICALLY UPDATED QUICK SEARCHES AND STRATEGIES

(75) Inventors: Bruce A. Morgan, Bellevue, WA (US); Keith D. Senzel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 266 days.

(21) Appl. No.: 11/317,381

(22) Filed: Dec. 22, 2005

(65) Prior Publication Data

US 2006/0129541 A1 Jun. 15, 2006

Related U.S. Application Data

(63) Continuation-in-part of application No. 10/226,506, filed on Aug. 22, 2002, now Pat. No. 7,039,635.

(60) Provisional application No. 60/388,153, filed on Jun. 11, 2002.

(51) Int. Cl.
*G06F 17/30* (2006.01)
(52) U.S. Cl. .............................. 707/4; 715/226; 715/227
(58) Field of Classification Search ...................... 707/4; 715/226, 227
See application file for complete search history.

(56) References Cited

U.S. PATENT DOCUMENTS

| | | | | |
|---|---|---|---|---|
| 4,255,796 A | | 3/1981 | Gabbe et al. ..................... 707/3 |
| 5,797,098 A | | 8/1998 | Schroeder et al. ........... 455/464 |
| 5,855,015 A | * | 12/1998 | Shoham ......................... 707/5 |
| 6,026,388 A | | 2/2000 | Liddy et al. ..................... 707/1 |
| 6,088,649 A | * | 7/2000 | Kadaba et al. ............... 701/201 |
| 6,226,620 B1 | * | 5/2001 | Oon ............................... 705/2 |
| 6,247,010 B1 | * | 6/2001 | Doi et al. ........................ 707/3 |
| 6,321,224 B1 | | 11/2001 | Beall et al. ..................... 707/5 |
| 6,322,366 B1 | * | 11/2001 | Bergan et al. ............... 434/118 |
| 6,411,950 B1 | | 6/2002 | Moricz et al. .................. 707/3 |
| 6,826,566 B2 | | 11/2004 | Lewak et al. ................... 707/4 |
| 7,039,635 B1 | * | 5/2006 | Morgan et al. ................. 707/4 |
| 7,181,438 B1 | * | 2/2007 | Szabo ............................ 707/2 |
| 7,185,001 B1 | * | 2/2007 | Burdick et al. ................. 707/3 |
| 7,277,881 B2 | * | 10/2007 | Imaichi et al. ................. 707/3 |
| 2001/0054020 A1 | * | 12/2001 | Barth et al. ................... 705/37 |
| 2002/0198875 A1 | * | 12/2002 | Masters ......................... 707/4 |
| 2003/0202002 A1 | * | 10/2003 | Kethireddy ................. 345/705 |

* cited by examiner

*Primary Examiner*—Tim T. Vo
*Assistant Examiner*—Anh Tai V Tran
(74) *Attorney, Agent, or Firm*—Perkins Coie LLP

(57) ABSTRACT

In response to characters entered within a Find dialog box, a minifind window is dynamically updated to provide corresponding search strategies and quick matches from content search data that are being searched. The search strategies and quick matches that are listed are dynamically updated as the user inputs additional characters in the Find dialog box. At any time, the user can initiate a full text search to populate a search results pane, based upon the characters input, by selecting a Go control or pressing the Enter key. Alternatively, the user can select one of the quick matches or search strategies, to populate the search results pane with corresponding items obtained from the content search data, which are most likely to relate to the information desired by the user. This approach is applicable to finding information in almost any data accessed locally, or over a network.

16 Claims, 8 Drawing Sheets

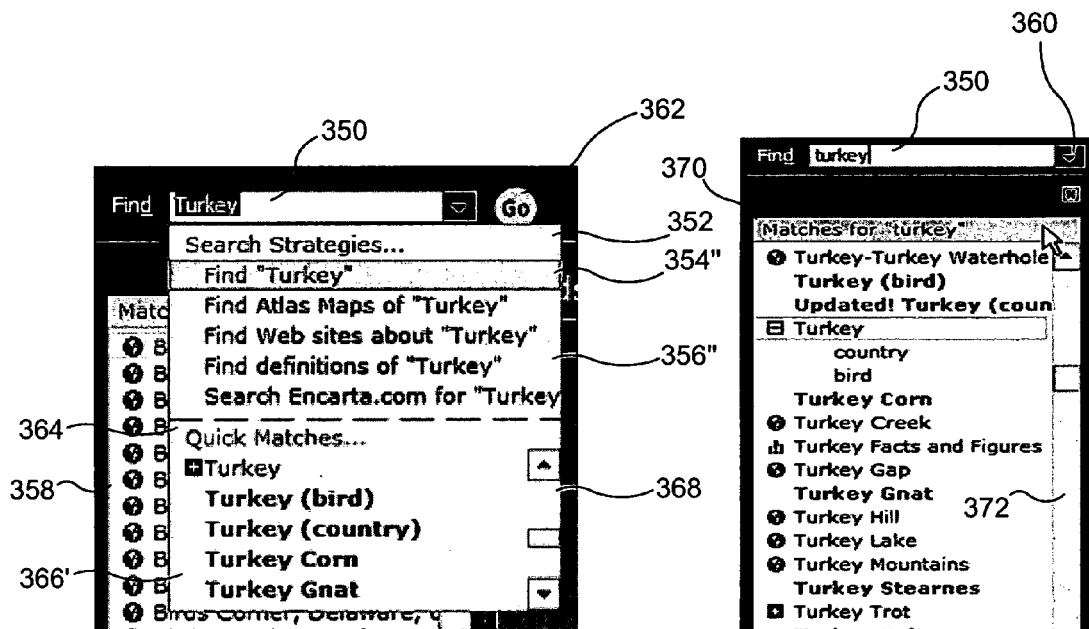
FIG. 8
FIG. 9
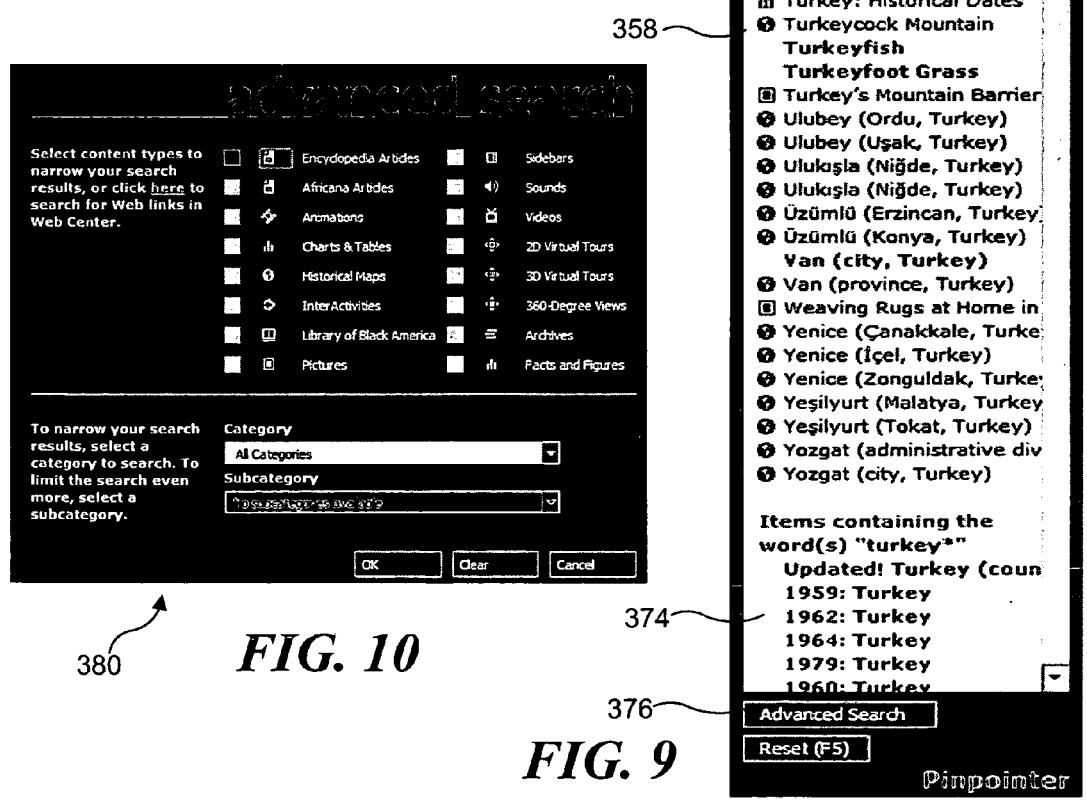
FIG. 10

DYNAMICALLY UPDATED QUICK SEARCHES AND STRATEGIES

RELATED APPLICATIONS

This application is a continuation of application Ser. No. 10/226,506, filed on Aug. 22, 2002, now U.S. Pat. No. 7,039,635, which is based on provisional application, Ser. No. 60/388,153, filed Jun. 11, 2002, the benefit of the filing dates of which is hereby claimed under 35 U.S.C. §120 and §119 (e).

FIELD OF THE INVENTION

This invention generally pertains to dynamically varying search data in response to an input by a user; and more specifically, provides for dynamically updating a proposed list of quick matches and a proposed list of search strategies in response to input by a user, to enable the user to more efficiently search and access desired information in a body of data.

BACKGROUND OF THE INVENTION

The amount of facts, information, and other data that are available online and in various data resources and reference works has grown tremendously in the recent past and will likely continue to expand exponentially. However, as the amount of data available increases, the task of identifying specific data of interest becomes correspondingly more difficult. Traditionally, hard copy reference works, such as encyclopedias, have been consulted to obtain information on a variety of topics. A person interested in reading information about a specific topic would either consult a subject index typically provided in the last volume of an encyclopedia, or simply select an appropriate volume to page through and find the desired information, based on the letter of the alphabet of the topic. For example, information on the "Civil War" might be found by selecting the encyclopedia volume that includes topics starting with the letter "C," and then paging through the topics that are alphabetically arranged within that volume, until the pages for the section on the Civil War topic are found.

The task of accessing a desired topic or specific information relating to a topic has been made much easier with the availability of relatively low-cost software reference works that are analogous to hard copy encyclopedias. In addition to text and images, the software reference works also typically include maps, animations, videos, and sound files relating to selected topics. Microsoft Corporation's ENCARTA™ Reference Library is an excellent example of such a software reference product. Currently, several gigabytes of data can be provided on a single digital video disk (DVD) in a software reference library. The Internet includes terabytes of data that can be used to supplement the data in a reference work. Unlike a hardcopy reference work, when attempting to access information in software reference libraries or on the Internet, it is not possible for a person to physically thumb through the data to find information based upon the initial letters of keywords or topics of interest. However, software reference works include search facilities that are designed to perform an analogous function by enabling a user to input a topic, or one or more keywords, a phrase, or question in a text box. The user then typically either presses the Enter key or selects a "Go" button or other equivalent control to initiate a search of the available data based upon the text input by the user.

In response to the user initiating the search as described above, a search engine will typically parse the text that was input and then produce a listing of search topics, sometimes many pages long, of possible "hits" that may be appropriate to the user's input. Search modules may rank these "hits" or search results according to their likely relevance to the input text, placing those that appear to be more relevant first in the list. For example, if a user inputs several keywords, hits that have more of the keywords will be listed before hits that have fewer keywords. However, it can be somewhat frustrating for a user reviewing the search results produced by such searches, since the hits may have little apparent relevance to the information that the user desired to find. One reason that the results of a search may not be as expected is because the user may be looking for a particular category of information, but the words input by the user can be interpreted by the search module in a different manner, so that the search returns results in an entirely different category. For example, if the user enters the word "turkey" hoping to find information on the correct temperature at which to roast a turkey, the results of the query may be a list of information related to the country "Turkey," or general information about the bird "turkey," or about commercial establishments that sell roasted or smoked turkeys. Accordingly, it would be preferable to provide a user an option for limiting the search results that will be returned to a specific category, before the search is actually carried out.

Reference works will sometimes enable a user to select a specific category prior to entry of a search query. For example, a user might selectively make a search for a geographic location by initially limiting the search to data maintained in an atlas database. Alternatively, after the user enters a query, the search engine may provide a list of alternatives in different categories from which the user may choose to more accurately access information of interest. For example, one search engine developed for use on the Internet (http://www.askjeeves.com) enables a user to enter a query as a plain language question. After the query is entered, the search engine parses the query text and displays a list of several possible questions representing different questions that may be related for which the search engine can provide information, as well as a list of related search terms, and a list of the search results for the search that was done in response to the query previously entered by the user. By selecting one of the proposed queries or search terms that seems to more closely indicate the information of interest, the user may be able to better access the desired information, since the search results returned in response to the user's query may not be very closely related to the desired information.

Often, searches can be implemented by entering only a single word, particularly, if the user has the ability to choose among various search strategies related to the word, and/or the ability to choose among items that are related to the word. For many words, it may be that typing only a portion of the word is sufficient to indicate the word in its entirety, or at least to narrow the field of choices regarding related matching items. Microsoft Corporation's INTERNET EXPLORER™ and other programs provide auto completion of text entries, using entries that were previously input in the program, but this capability does not extend to indicating proposed search strategies or proposed matching items, based upon a partial entry of a word or phrase. Almost every program that proposes alternative searches or keywords does so only after the user has actually completed a query and entered it. Instead of requiring the user to enter a query before responding, it would be desirable to dynamically list proposed search strategies and possible matches that correspond to the characters input by the use, and to refine the list of proposed search strategies and matches as the user continues to input additional letters in a text box. Such an approach is analogous in some respects to the manual technique applied by a person in looking up information in an index or listing based upon the alphabetical order of the characters in a word.

Preferably, after at least a minimum number of characters are entered by a user, the dynamically refined matches should be listed in a preferred order of priority, with the matching items having the characters input by the user as their first characters, followed by alternative choices that include the characters input by the user, as part of other words in the matching items. A user should also have the option to enter all of the characters of a keyword or multiple words, to enable full text searching. After dynamically modifying the list of proposed search strategies and matches corresponding to the characters that have been input, a user should be able to select one of the search strategies or matches that will likely yield the desired information the user is attempting to find. This approach would be extremely helpful for children, who may not be comfortable typing long words, and for people whose native language (e.g., the Asiatic languages) is relatively complex and not easily entered in a text box using a keyboard. The prior art does not provide any corresponding dynamically updated listing of search strategies or matching items.

SUMMARY OF THE INVENTION

To simplify searching for information, the present invention is directed to a method for dynamically responding to a string of characters being input by a user in a text box to define a search of available content data. After the first character is input in the text box, separate lists of quick matches and search strategies are populated by searching the content data to identify items related to the character that was input. The quick match list may include one or more items, each having a word that begins with the character. An exemplary search strategy might be, "find the [character that was input] in an atlas."

As the user inputs an additional character, the populations of the search strategy and quick match lists are updated appropriately to refer to items that include the characters input. After at least a predefined number of characters are input, the lists are populated only with quick matches and search strategies corresponding only to data that refer to the characters input by the user. At any time, the user may select one of the quick matches or one of the search strategies in these respective lists to initiate the search of the data based upon the selected item, or may initiate a search based upon the characters thus far input. A search result pane is populated with the results of the search. The user may select an item included in the search results pane to access the information associated with the selected item in the content data.

The lists of items populating the quick matches and search strategies are not updated until at least a predefined time interval has elapsed since the last character was input by the user, to avoid incurring an undesirable delay while the lists are dynamically repopulated, when the user wants to rapidly input a plurality of characters. After the predefined number of characters are input, the lists are populated only with items that include the characters input. The order of the quick matches in the list are preferably prioritized accordingly to the likelihood of matching the input of the user. If no matching item is found in the content data being searched for a quick match, the closest available quick match is included in the list. If no match is found for a search strategy in the content data, the search strategy list is populated with a plurality of default predefined search strategies.

A user can press the Enter (or other designated) key or select a designated control in a user interface, to initiate a search based upon characters input by the user.

After initiating a search, the user can return to the previous lists of quick matches and search strategies, by selecting a designated control provided in the user interface.

An advanced search option is also provided to enable searching for information in the content data specifically limited or filtered to a selected category or type.

Another aspect of the present invention is directed to a system for searching data. The system includes a memory in which machine instructions are stored, a display, a user input device, and a processor coupled to the memory, the display, and the user input device. The processor executes the machine instructions to implement functions generally consistent with the above described method.

Yet another aspect of the present invention is directed to a memory medium having machine instructions for implementing the steps of the method discussed above.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein:

FIG. 8 illustrates the exemplary Find dialog box after a full word has been input, showing changes in the list of search strategies and quick matches;

FIG. 9 illustrates an exemplary search results pane produced after a user has pressed Enter (or Go); and FIG. 10 illustrates exemplary advanced options for filtering the search results.

DESCRIPTION OF THE PREFERRED EMBODIMENT

System Suitable for Executing the Present Invention

Although not required, the present invention will be described in the general context of computer executable instructions, such as program modules that are executed by a PC. Generally, program modules include routines, programs, objects, components, data structures, etc. that perform particular tasks or implement particular abstract data types. Moreover, those skilled in the art will appreciate that this invention may be practiced with other computer system configurations, particularly in regard to a client device for displaying a Web page, including handheld devices, pocket personal computing devices, digital cell phones adapted to connect to a network, and other microprocessor-based or programmable consumer electronic devices, game consoles, TV set-top boxes, multiprocessor systems, network PCs, minicomputers, mainframe computers, industrial control equipment, automotive equipment, aerospace equipment, and the like. The invention may also be practiced in distributed computing environments where tasks are performed by remote processing devices that are linked through a communications network. In a distributed computing environment, program modules may be located in both local and remote memory storage devices.

Figure 1:
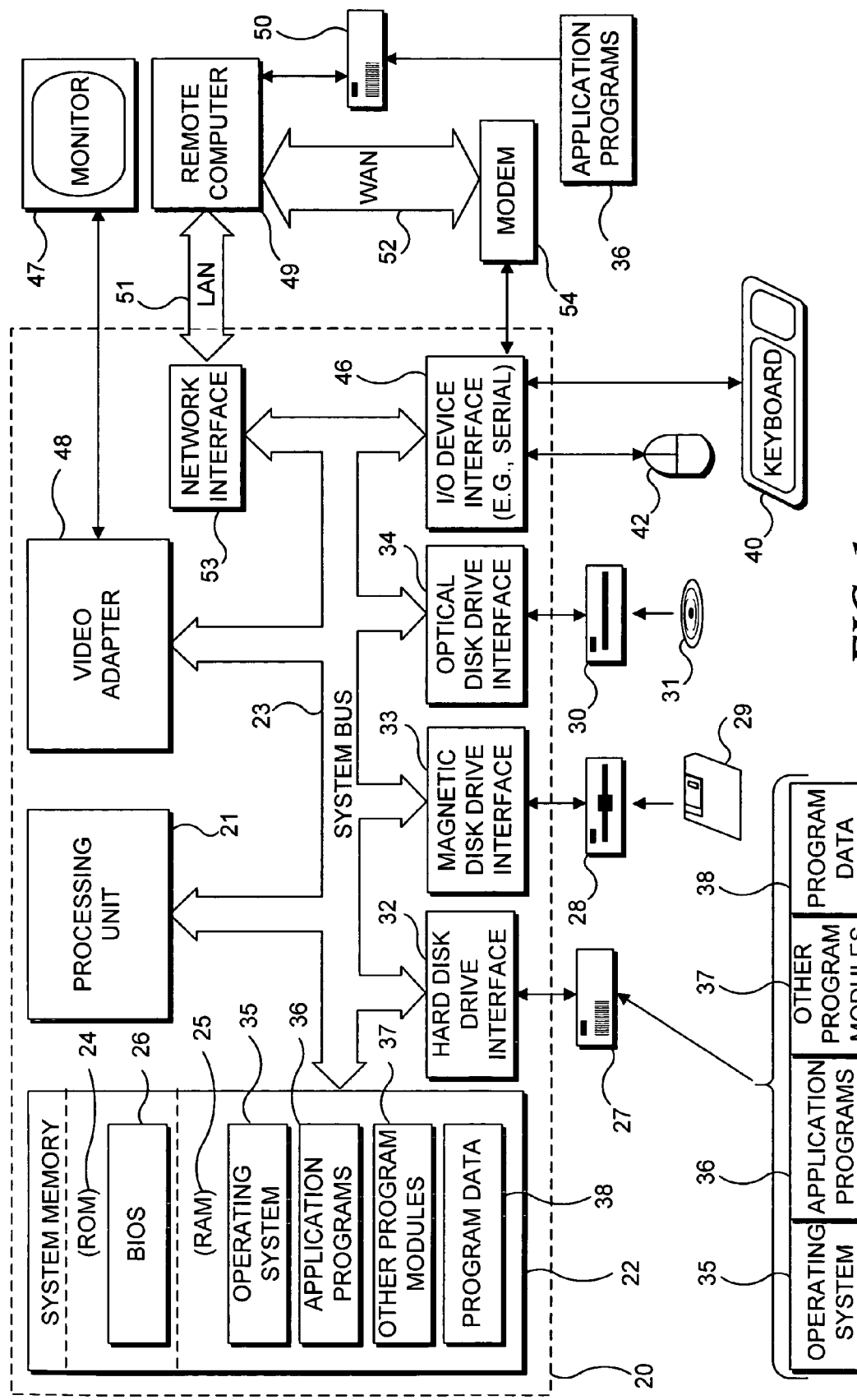
FIG. 1 is a block diagram of a generally conventional personal computer (PC) system that is suitable for implementing the present invention.

With reference to FIG. 1, an exemplary system for implementing the present invention includes a general purpose computing device in the form of a conventional PC 20, provided with a processing unit 21, a system memory 22, and a system bus 23. The system bus couples various system components including the system memory to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output (BIOS) system 26, containing the basic routines that help to transfer information between elements within the PC 20, such as during start up, is stored in ROM 24. The PC 20 further includes a hard disk drive 27 for reading from and writing to a hard disk (not shown), a magnetic disk drive 28 for reading from or writing to a removable magnetic disk 29, and an optical disc drive 30 for reading from or writing to a removable optical disc 31, such as a CD-ROM or other optical media, such as a DVD on which data being searched by the present invention may be stored. Hard disk drive 27, magnetic disk drive 28, and optical disc drive 30 are connected to system bus 23 by a hard disk drive interface 32, a magnetic disk drive interface 33, and an optical drive interface 34, respectively. The drives and their associated computer-readable media provide nonvolatile storage of computer-readable machine instructions, data structures, program modules, and other data for PC 20. Although the exemplary environment described herein employs a hard disk, a removable magnetic disk 29, and a removable optical disc 31, it will be appreciated by those skilled in the art that other types of computer-readable media, which can store data that is accessible by a computer and may be searched by the present invention, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35 (with a browser function), one or more application programs 36 (such as a setup program), other program modules 37, and program data 38. A user may enter commands and information into PC 20 through input devices such as a keyboard 40 and a pointing device 42. Other input devices (not shown) may include a microphone, joystick, game pad, satellite dish, scanner, digital camera, or the like. These and other input devices are often connected to processing unit 21 through an input/output (I/O) device interface 46 that is coupled to the system bus. Output devices, such as a printer (not shown), may also be connected to processing unit 21 through an I/O device interface 46 that is coupled to the system bus. Similarly, a monitor 47 or other type of display device is also connected to system bus 23 via an appropriate interface, such as a video adapter 48, and is usable to display Web pages, and/or other information accessed in accord with the present invention. In addition to the monitor, PCs are often coupled to other peripheral output devices (not shown), such as speakers (through a sound card or other audio interface—not shown). Such input/output devices are generally referred to as peripheral devices. For purposes of discussion in regard to the present invention, general peripheral device 56 is coupled to PC 20 via I/O device interface 46. The term I/O device interface is intended to encompass each interface specifically used for a serial port, a parallel port, a game port, a keyboard port, and/or a USB port. Through I/O device interface 46, information is communicated between peripheral device 56 and processing unit 21 via system bus 23. Peripheral device 56 includes firmware memory 58 for storing information. Firmware memory 58 may be erasable programmable read only memory (EPROM), flash memory, magnetic storage, or other memory. Firmware memory 58 stores a vendor ID, a product ID, serial number, firmware revision level, and/or other information related to the peripheral device 56. Firmware memory 58 also stores a URI or other type of address indicating a location from which a driver, data, and/or other material relevant to the peripheral device can be accessed and/or downloaded.

PC 20 may operate in a networked environment using logical connections to one or more remote sources, such as a remote computer 49. In regard to the present invention, the URI or address stored in the memory of the peripheral device may specify a location that is accessed through remote computer 49. Remote computer 49 may be another PC, a server (which is typically generally configured much like PC 20), a router, a network PC, a peer device, a satellite, or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54 or other means for establishing communications over WAN 52, such as the Internet. Modem 54, which may be internal or external, is connected to the system bus 23, or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Overview of the Present Invention

The present invention recognizes that some types of information included in content search data are stored in such a way that search results can more efficiently be presented as the user inputs text on a character-by-character basis, with the search results becoming narrower in scope and more accurate as more characters are typed. This approach is an excellent way to support both Far Eastern languages that are difficult to type, and users with limited typing and/or spelling abilities, such as children. Other types of information included in content search data are best presented as a list of results after a user presses an Enter key on a keyboard or otherwise indicates that no further input is to be provided. Input of a full word or a phrase may be better during full text-searches, where the search tends to take a significant amount of processing time and typing would be hindered if a character-by-character dynamic approach were attempted.

Clearly, it is preferable to immediately show to the user the "best match" for a search string input by the user, without requiring an additional selection on the part of the user. For example, if the user types "Seattle" and presses Return (i.e., the Enter key or a Go control), it is preferable to immediately show data about the city of Seattle rather than requiring the user to again choose "Seattle" from a list of results.

Because of their varied past experiences, users tend to employ a variety of styles and formats when entering text to initiate a search. Consequently, it is difficult to discern user intent solely from the search string that is input. For example, a user might type "George Washington" and hope to find an article with that title, while another user may intend to find places with that name.

Returning desired information involving maps is a particularly difficult problem, because there are so many place names in an atlas that nearly all search results return dozens or even hundreds of results for geographic locations. Thus, a user might type "San Jose" and hope to find a map of San Jose, Calif., while another may expect to find information on a river by that name in New Mexico. Also, place names can other meanings. If a user types "Turkey," it will not be evident whether the user is expecting to find a map of the country, an article on the country, or an article on the bird.

In addition, it is difficult to determine whether a user is interested in accessing audio/visual information on a subject. For example, a user might type "pictures of dogs" and expect a result list containing images of different breeds of "dogs." However, a search program might just as logically return a references to movies about dogs.

When designing a search module, one might assume that a search string always means "search for all content containing the words," which is how many prior art search engines work. It is also possible to require a user to preselect different categories (e.g., "only maps," or only "articles and images") before starting to search on text input, but that approach has been demonstrated to provide poor usability. Instead, the present invention achieves greater efficiency by employing two different search results windows, including one that displays minisearch, character-by-character results (and is thus referred to as a "minifind window"), and one that shows results of a full text search. Further, the minifind window is divided into two different lists, including one that shows English-like search suggestions (referred to herein as "search strategies") that are algorithmically produced from the search string entered and are dynamically updated as the user inputs additional characters, and a second list of search results, called "quick matches," which are also dynamically updated as characters are input by the user. The search strategies list includes different proposed data sources and/or different proposed data categories that can be selected by the user.

Figure 2:
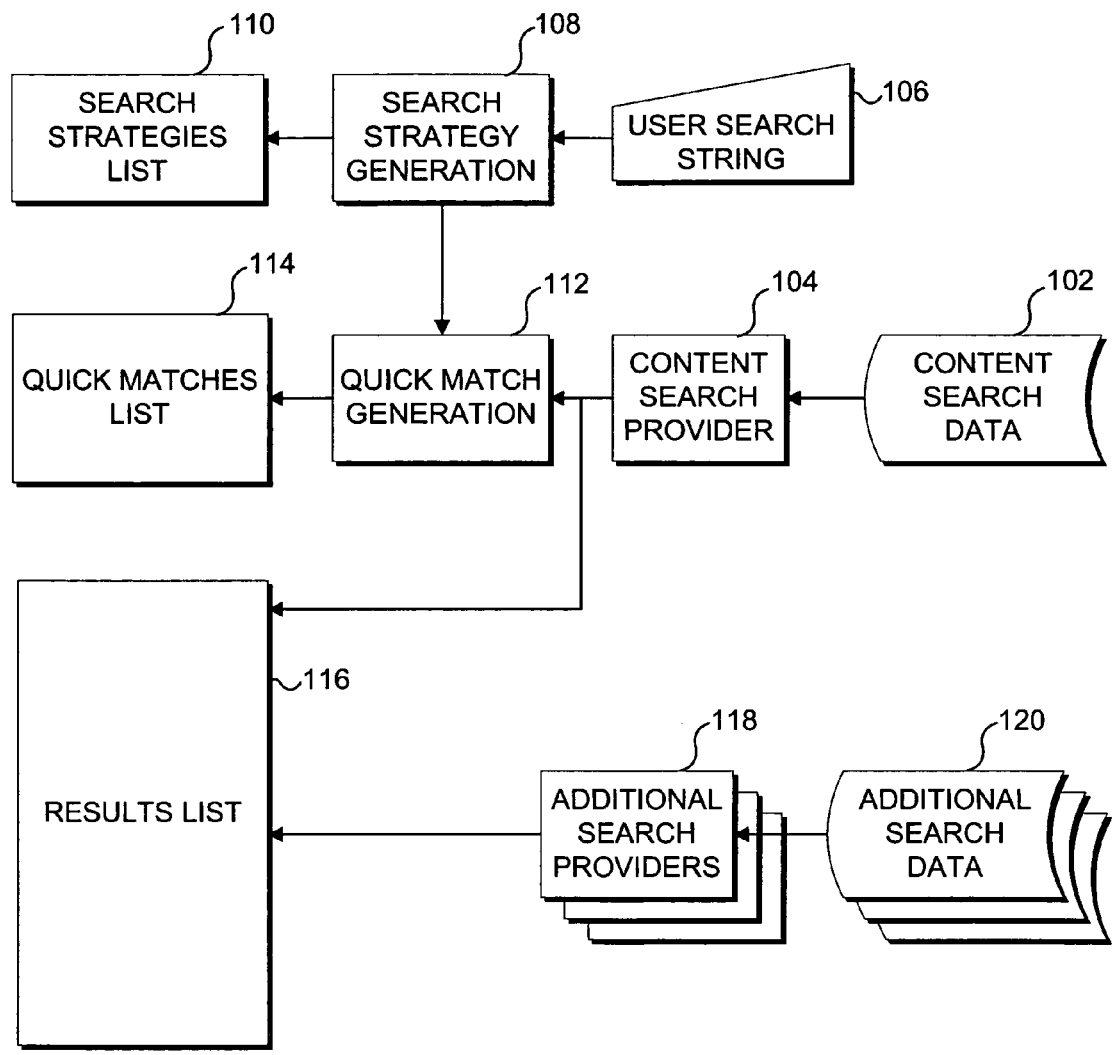
FIG. 2 is a block diagram illustrating functional components of the present invention.

FIG. 2 illustrates a block diagram 100 that includes the functional components comprising the present invention. As noted above, the purpose of the present invention is to enable a user to more efficiently find desired information within content search data 102. An exemplary application of the present invention disclosed herein is in Microsoft Corporation's ENCARTA™ Reference Library, where the invention enables a user to access specific information. Content search data can be stored on a memory media, such as the user's hard drive, or on a compact disk-read only memory (CD-ROM), or on a DVD. Since the DVD version of this reference library includes over 2.6 gigabytes of data, it should be apparent that any steps taken to assist the user in finding data will be of substantial benefit.

When the ENCARTA Reference Library program is installed, the user is given the option of copying all of the data on the CD-ROM or the DVD over to the user's hard drive. In addition, the user can access additional search data 120 that is not included with the software program content search data, such as online data accessed over the Internet. Although a preferred exemplary embodiment of the present invention is disclosed for use with the ENCARTA Reference Library, it will be apparent that the present invention can also be applied to many other types of applications. For example, the present invention can be used to search data in almost any database, or can be incorporated into an Internet search engine. Virtually any searching activity conducted in response to an input of characters by a user to specify keywords or a search query, can benefit from the present invention.

As shown in FIG. 2, a block 106 indicates that the user inputs a search string. Typically, the user will input one character at a time, using a conventional keyboard. However, it is also contemplated that a touch screen, pointing device, or other form of user input could be employed in block 106 for input of characters to initiate a search for desired information. The characters input by the user are acted upon by the present invention to generate one or more search strategies, as indicated in a block 108, to populate a search strategies list 110. In addition, in response to the input of a search string by the user in block 106, the present invention also generates quick matches list 114, as indicated in a block 112.

In order to generate the quick matches list, the present invention accesses content search data 102 through one or more content search providers 104. Content search provider 104 can be one of several different types, including an atlas or map search provider that searches atlas place names through a specific algorithm and returns quick matches as a result, and a dictionary search provider that searches dictionary definition titles and returns quick matches corresponding to the search string. Similarly, a contents search provider searches the titles of various content types such as articles, media sound clips or video clips, timeline entry titles, a Library of Black American books, Web links, and other content to identify corresponding matches to populate the quick matches list.

The search strategy generation also relies upon the content search provider to access the content search data to develop a search strategy to populate search strategies list 110. Additional search providers 118 are accessed when additional search data 120 are searched to populate results list 116. Further details of both the search strategy generation and quick match generation are described below.

Search strategies list 110 is preferably populated by parsing the search string input by the user to identify certain keywords such as "map," or "photo," or "video," or to identify other appropriate keywords indicating the type of information desired by the user. For example, if the user enters a string "photo of dolphin," the keyword "photo" would cause search strategies list 110 to be populated with a search strategy "find images about 'dolphin'." In addition to including search strategies based upon keywords included in the string input by the user, the search strategies list also includes generic search strategies, such as "Find [search string]," "Find atlas maps of [search string]," "Find definitions of [search string]," etc.

In addition, it is contemplated that the search strategies list will be reordered based upon a "best match" determined algorithmically. In this approach, certain items may be removed and other items added. For example, if the user types "map of Canada" as the search string, search strategies list 110 might be reordered to put the item, "Find atlas maps of 'Canada'" at the top of the list, with a search strategy, "Find 'map of Canada'" lower down on the list and might remove the search strategy, "Find definitions of 'Canada'."

An advantage of listing search strategies in a prioritized manner is that this prioritized listing should improve the user's ability to identify the search strategy that is most likely to enable the user to access the desired information. Thus, if the user types the search string "Reading" with the intent of finding a map of Reading, Pa., then the user can see the search strategy, Find atlas maps of "Reading" and immediately click that item to perform exactly the search that should produce the desired result. Conversely, if the user's intent was instead to find content about the verb "reading," then the search strategy, "Find 'reading'" could be clicked to perform a broad search on the word "reading." Further, if the user's intent was simply to find a dictionary definition of the word "reading," then clicking on the strategy, "Find definition of 'reading'" would produce the desired result.

A key aspect of the present invention is that the search strategy generation and quick match generation are dynamic in regard to the input of strings by the user. Thus, as the user types a first character of a text string, the quick matches list is populated with items by one or more of the content search providers, using items that start with the character input by the user. Similarly, the search strategies list is populated with items based upon the first character input by the user. As the user inputs additional characters in the search string, search strategies list 110 and quick matches list 114 are revised or repopulated to include items starting with the characters that have been input.

At any time, the user has the option of either initiating a search based upon the input string already provided, which populates results list 116 with all the search items corresponding to the one or more characters input by the user. Alternatively, the user can select one of the search strategies and carry out a search based on the search strategy thus selected to populate results list 116 with corresponding results. Similarly, the user can select any of the quick matches from quick matches list 114 and initiate the search for the specific data indicated by the selected quick match to populate results list 116 with a prioritized list of items.

Because search strategies list 110 and quick matches list 114 are dynamically updated as the user inputs additional characters in a string, the present invention enables the user to input fewer characters and be presented with quick matches corresponding to the intended input within quick matches list 114 so that the user need not enter the entire word or phrase. For example, if the user desires information about the city of "Seattle," then the user need only input the characters "Seat" to obtain a quick match listing that includes the term "Seattle." By selecting that quick match term, data about Seattle will then be displayed to the user.

The dynamic update of the search strategies list and quick matches list provides less benefit to a user interested in doing a full text search. If interested in searching full text, the user will likely enter the full text query and simply press the Enter key, or initiate the search on the full expression that has been input using the Go control provided on the user interface of the ENCARTA Reference Library program.

Exemplary User Interface

Figure 7A:
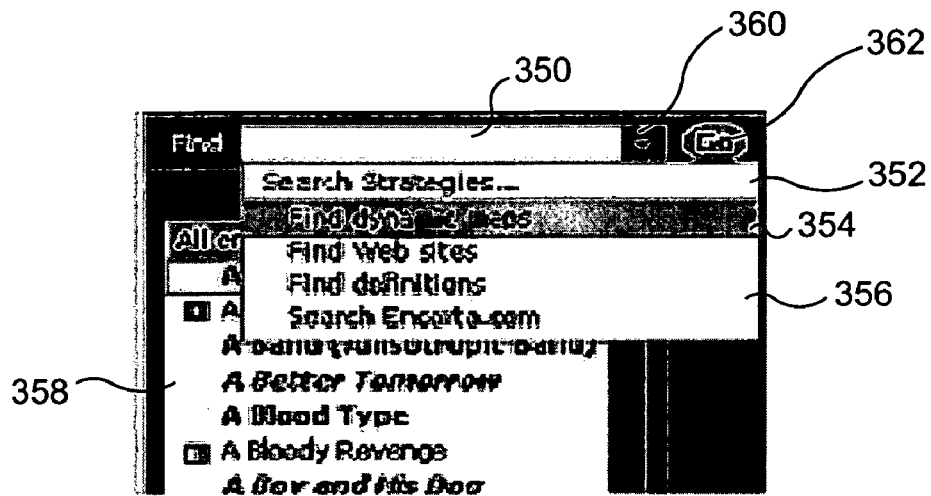
FIG. 7A illustrates an exemplary Find dialog box for entry of a search query prior to input of any text, showing a list of default general search strategies.

FIG. 7A illustrates a Find dialog box 350, which is empty prior to entry of any string characters input by the user. Since no characters have been input by the user, a search strategies list 352 includes only general default search strategies 356, highlighting a first search strategy 354. Underlying search strategies 352 is a search results pane 358 that currently lists all of the items in the content search data. A toggle control 360 is included to toggle the display of the minifind window. Also shown is a Go control 362, which the user can select after entering one or more characters to initiate a search of the content data based upon the characters that were input by the user in Find dialog box 350.

Figure 7B:
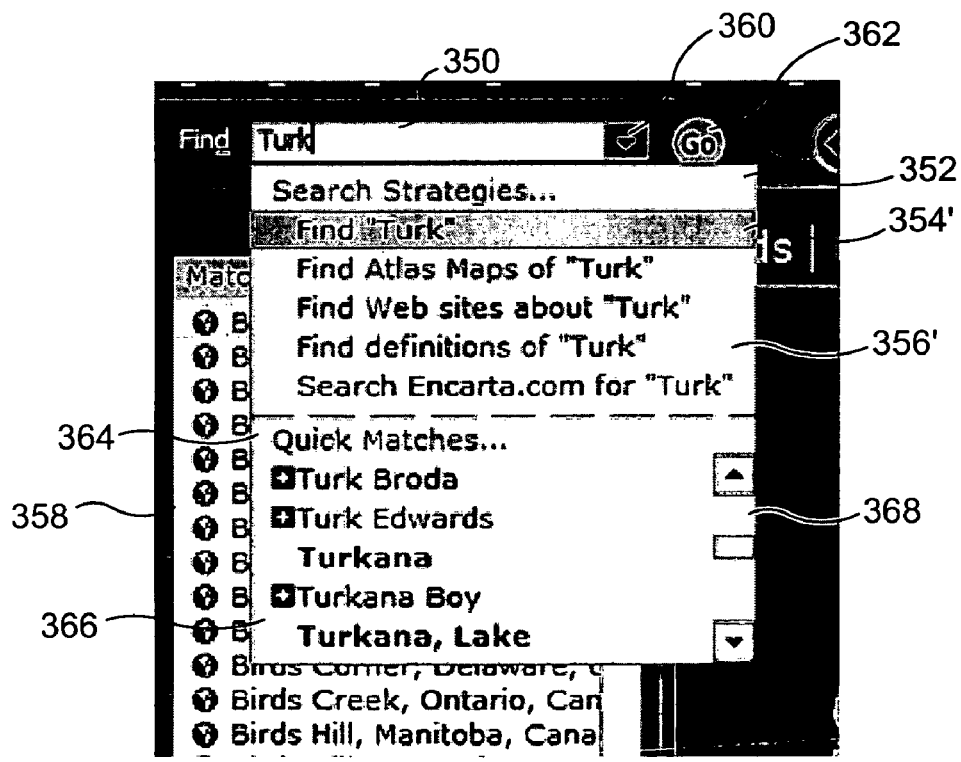
FIG. 7B illustrates the exemplary Find dialog box after four characters have been input, showing how the list of search strategies has changed in response thereto, and showing a list of corresponding quick matches.

FIG. 7B illustrates Find dialog box 350 after the user has input "Turk." A search strategies list 356' now includes search strategies that correspond to the characters input by the user with a highlighted first entry. In addition, quick matches list 364 has been populated with a plurality of quick matches 366 that relate to the text string input by the user in Find dialog box 350, only a portion of which are shown. To access other of the quick matches, a scroll bar 368 can be manipulated using either the keyboard or a pointing device, such as a mouse to scroll through the other quick matches populating quick matches list 354'.

As other characters are input by the user, search strategies list 352 and quick matches list 364 are repopulated with corresponding related entries. FIG. 8 illustrates Find dialog box 350 after the user has input the full word, "Turkey." As shown therein, search strategies list 352 now includes search strategies 356" corresponding to the word input by the user. Similarly, quick matches list 364 is now populated with corresponding quick matches 366'. The user can select any of the search strategies 356", or any of the quick matches 366', to populate search results pane 358 with the corresponding results. Also, a user can press the Enter key or activate Go control 362 to populate search results pane 358 based upon the word text strings input in Find dialog box 350, and to display the best matching content search data corresponding to the search string input by the user.

FIG. 9 illustrates search results pane 358 after either the Enter key has been depressed, or Go control 362 has been activated by the user. Matching results 370 of a full search on the characters input by the user are included in the items listed in search results pane 358. Although not shown, the content search data relating to the country "Turkey," which is the best match, are displayed to the user in a window disposed adjacent to the search results pane. A scroll bar 372 is provided to enable the user to scroll to other search result items within search results pane 358. Items 374 are listed that contain the search string input by the user.

Optionally, the user can select an advanced search button 376, which displays advanced search options 380 as shown in FIG. 10. These advance search options enable the user to filter the search results shown in search results pane 358, according to content type, or according to a selected category/subcategory.

Logic Implemented by the Present Invention

Figure 3:
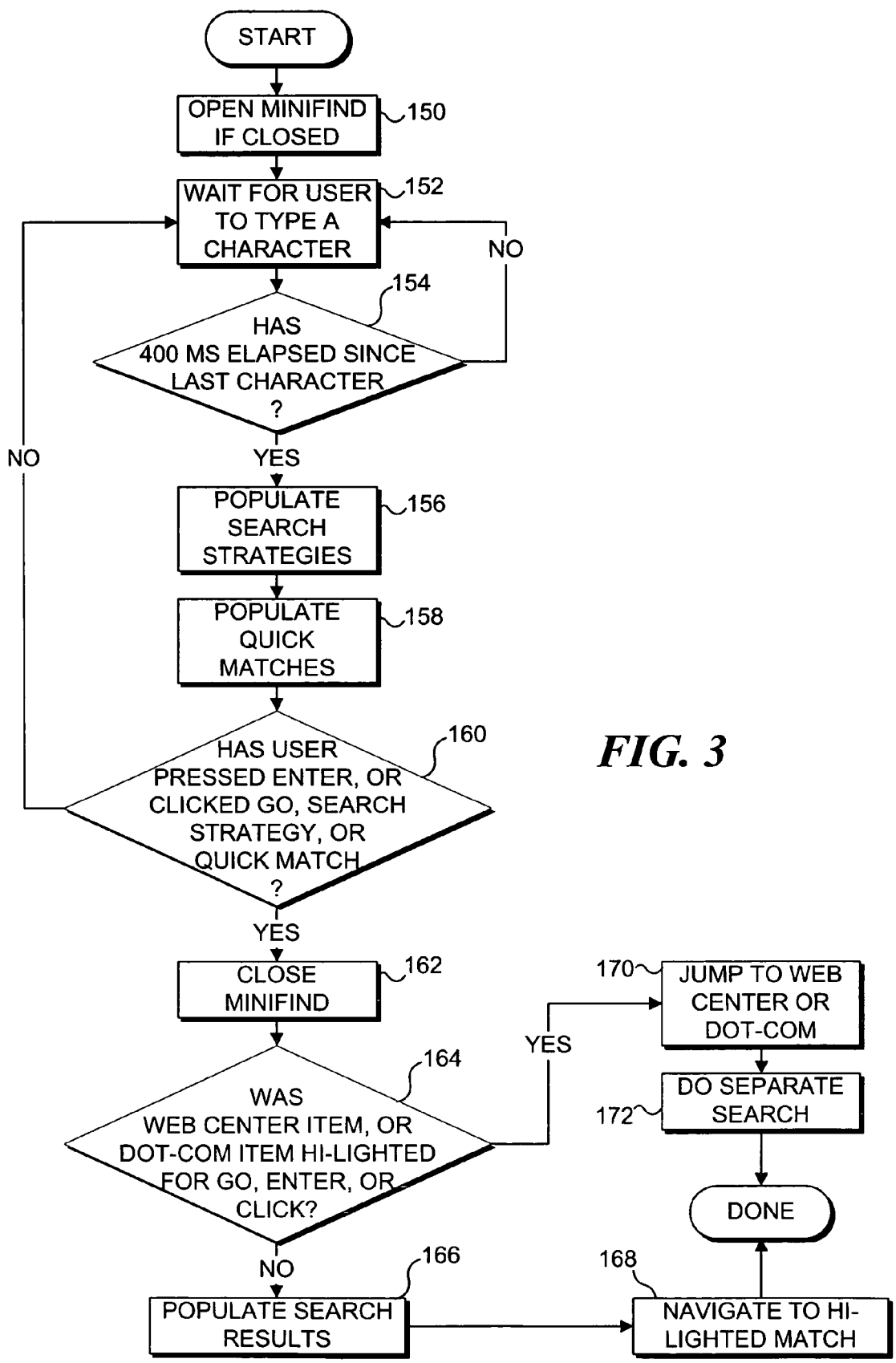
FIG. 3 is an overview flow chart illustrating the steps implemented in accord with the present invention in response to a user entering input text to initiate a search of data.

With reference to FIG. 3, an overview of the logic carried out by the present invention is illustrated. In this flow chart, following a start block, a step 150 opens the minifind window, if it is closed. Simply placing the cursor within the Find dialog box will cause the search results pane to open if it was previously closed, and either typing a character in the Find dialog box or clicking the down arrow with a pointing device will cause the minifind window to open, if it was previously closed. Next, a step 152 waits for a user to type a character within the Find dialog box. A decision step 154 determines if at least 400 milliseconds has elapsed since the last character was input by the user. The purpose of this decision step is to avoid delaying the user if a rapid succession of characters are input by the user. The dynamic update carried out by the present invention takes a finite time, and it is preferable not to dynamically update the search strategies if doing so would delay the user inputting additional characters for the search string. If less than 400 milliseconds has elapsed, the logic simply loops back to step 152. Otherwise, the logic proceeds to a step 156, which populates the search strategies list. Details of this step are described below. Next, a step 158 populates the quick matches list based upon the one or more characters input by the user. Again, details of step 158 are also described below.

A decision step 160 determines if the user has pressed Enter or activated the Go control, or selected one of the search strategies or quick match items in either of those lists. If not, the logic returns to step 152 to wait for the user to input another character (or to initiate a search by carrying out one of the user options indicated in decision step 160). Once the user has pressed Enter, activated Go control, or clicked one of the search strategies or quick match items, a step 162 closes the minifind window.

A decision step 164 determines if a Web center item or other dot.com item was highlighted prior to the user selecting the Go control, pressing the Enter key, or clicking on such a item. The Web center is a browser shell that accesses Internet links, which can be selected to view additional search data within the Web center shell (if the user's PC is able to connect to the Internet). If the results in decision step 164 is negative, a step 166 populates the search results pane with the content search data items that correspond to the selected search strategy, or quick match, or string that was input in the Find dialog box. The logic then navigates to the most likely highlighted matching item, enabling the data content corresponding to that match to be displayed to the user. Following step 168, the search logic is complete.

If a Web center item, or dot.com item was hi-lighted in decision step 164, the logic instead jumps to the Web center or dot.com location in a step 170. Next, a separate search is done of the content data done at the Web center or dot.com location in a step 172. In the case of Microsoft Corporation's ENCARTA, an ENCARTA Web site provides additional data beyond the scope of the data provided with the DVD or CD-ROM. Alternatively, the user has the option of searching for additional data at other Web sites on the Internet relating to the input string provided in the Find dialog box.

Figure 4:
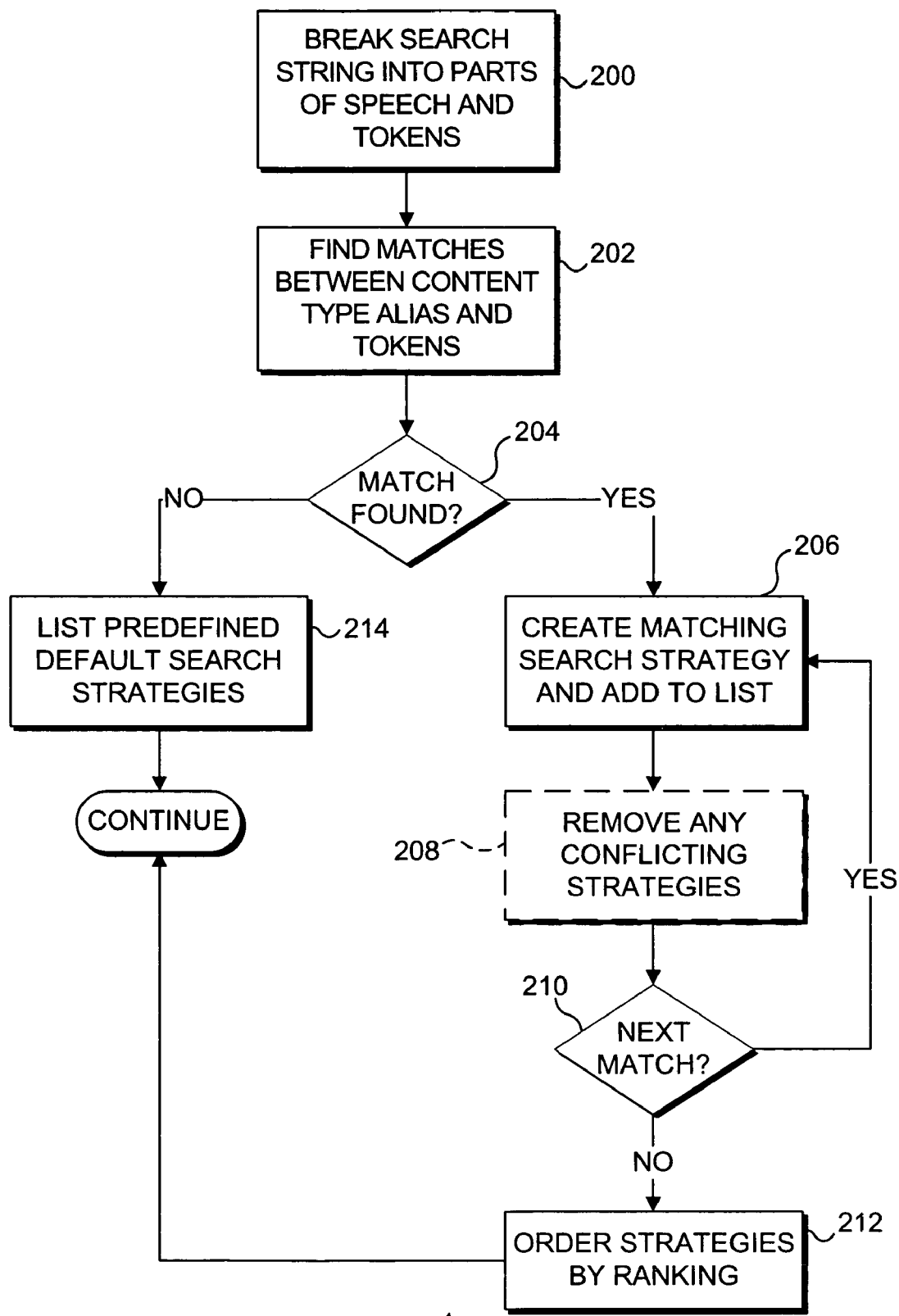
FIG. 4 is a more detailed flow chart illustrating the steps carried out to populate a search strategies list.

FIG. 4 illustrates details of the steps carried out to populate the search strategies list for step 156 in FIG. 3. As shown in FIG. 4, a step 200 breaks a search string into parts of speech and tokens. Step 200 provides for parsing the string input by the user, which may comprise a portion of a word or even a single character, or one or more words. Next, a step 202 finds any matches between search content data types, aliases, and tokens relative to the parts of speech and tokens identified in step 200. Step 202 automatically eliminates stop words, articles, prepositions, and other parts of speech. It is in this step that matches are identified between words that are different but are equivalent, i.e., to identify aliases. For example, the name "Bill" is treated as an alias of the name "William." Similarly, if the user has entered words such as "photo," step 202 identifies the word as an alias of the keyword "image." A number of different approaches can be used for finding matches in step 202, including use of a natural language query (NLQ) engine, which is based on structured (relational) information sources.

A decision step 204 determines if a match was found in step 202. If so, a step 206 creates a matching search strategy and adds it to the list of search strategies. Since a user may have input an additional character that substantially alters the previous search strategies listed, an optional step 208 removes any conflicting strategies that are inappropriate in view of the current search string that has been input by the user. Next, decision step 210 checks to determine if there is yet another match identified in step 202 and if so, the logic returns to step 206 to add another search strategy to the list. After no additional matches are identified in decision step 210, the logic proceeds to a step 212, which orders the strategies in the list by rank, with the higher priority strategies (i.e., the most likely intended strategies) moved near the top of the list and the lower priority strategies moved nearer the bottom of the list.

In the event that no match can be found in decision step 204, a step 214 populates the list of search strategies with predefined default search strategies. In a current preferred embodiment, some of the predefined default search strategies are typically still included in the list of search strategies, even if other matches are identified. Following either step 212 or 214, the logic continues with step 158 in FIG. 3.

Figure 5:
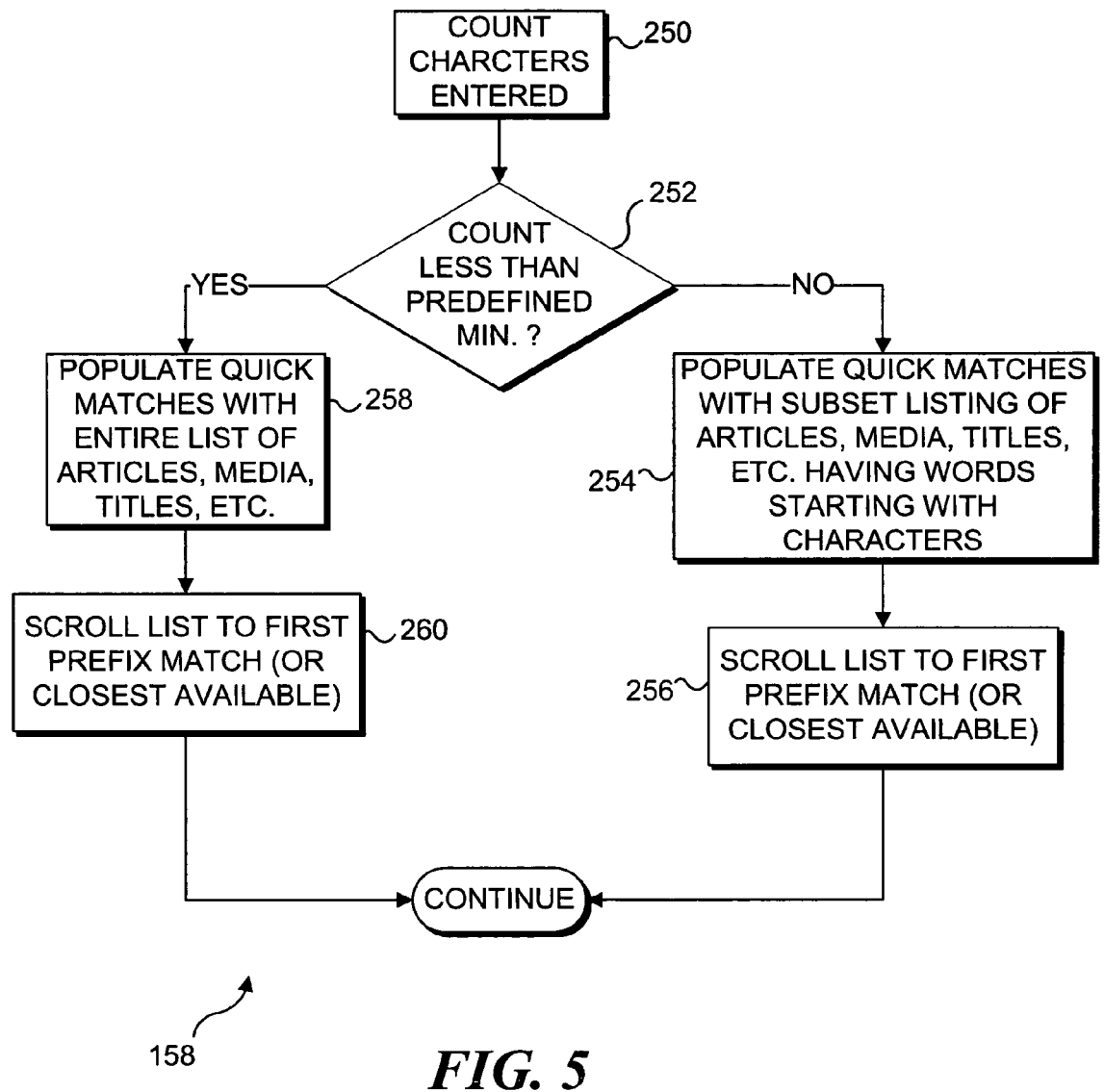
FIG. 5 is a more detailed flow chart illustrating the steps carried out to populate a quick matches list.

FIG. 5 illustrates details of step 158 from FIG. 3, which provides for populating a quick matches listing. As shown in FIG. 5, a step 250 counts the number of characters entered. If the count obtained in step 250 is not less than (i.e., is greater than or equal to) a predefined minimum in a decision step 252, a step 254 populates the quick matches list of the minifind window with a subset listing of articles, media, titles, etc. having words that start with the characters currently input by the user. In decision step 252, the predefined minimum is three for English, but for Asiatic languages, the predefined minimum is two characters. Next, a step 256 scrolls through the list of quick matches to the first prefix match in the items from the search content data. If none of the items have the first characters input by the user within the string, the software scrolls to the closest available data within the search data content. For example, if the user has entered "zz," there are no direct matches within the content search data, since none of the items begin with zz. Accordingly, the logic scrolls to the first available item which is "Z-80."

In the event that the count determined in step 250 is less than the predefined minimum in decision step 252, a step 258 populates the quick matches list with the entire list of articles, media, titles, etc. Next, the logic in a step 260 scrolls through the list to the first prefix match (or closest available match). It should be noted that step 254 substantially reduces the number of items included in the quick matches list, compared to step 258. Also, step 254 includes items with words that start with the characters input by the user, even though the words are not the first words in the item as displayed. For example, if the user enters "rup," the quick matches listing will include "Prince Rupert." Following steps 260 or 256, the logic continues with decision step 160 in FIG. 3.

Figure 6:
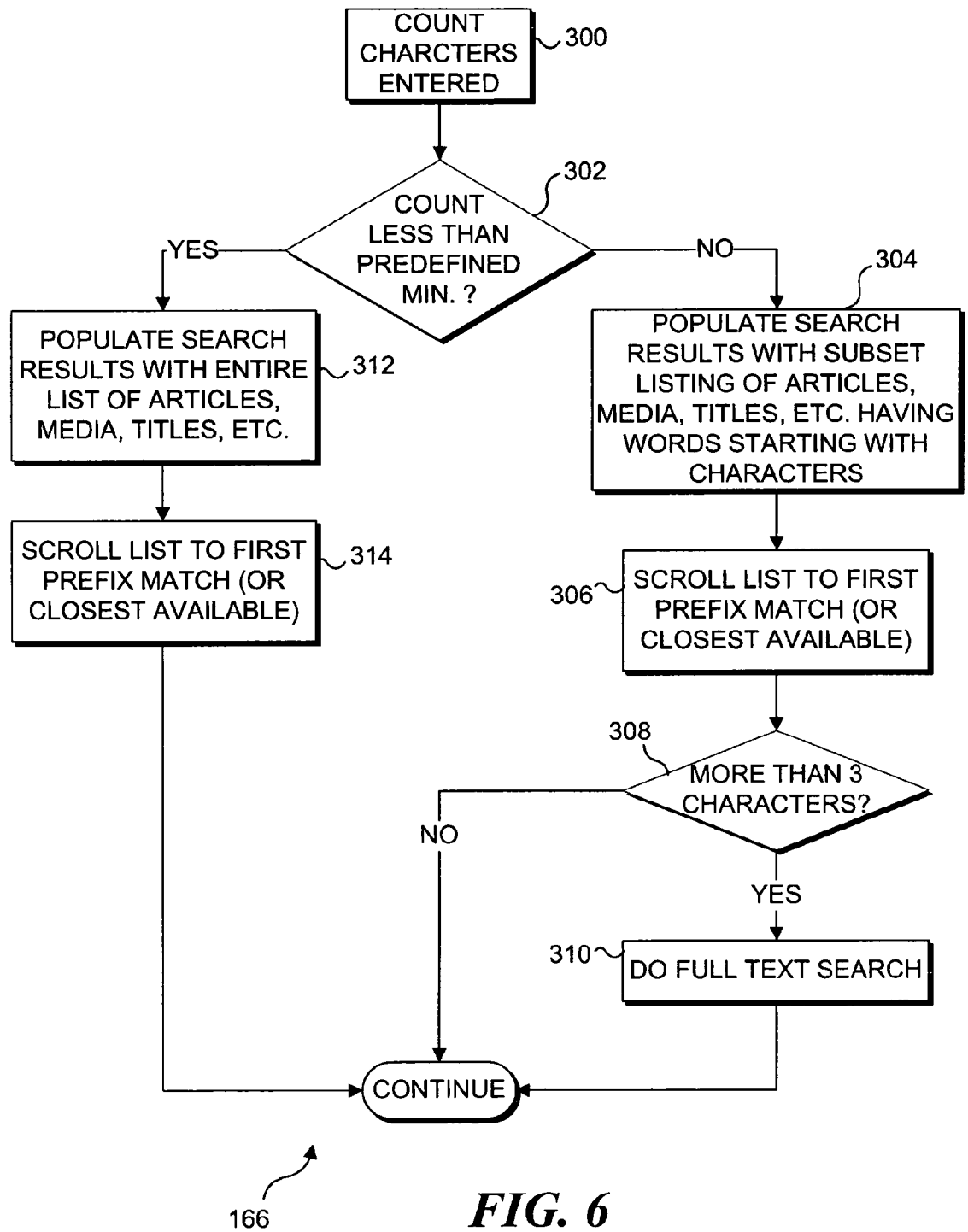
FIG. 6 is a more detailed flow chart showing the steps carried out to populate a search results pane.

Details of step 166 from FIG. 3 are illustrated in FIG. 6. To populate the search results pane, the logic begins at a step 300 in FIG. 6, which again counts the number of characters entered. If the number of characters is greater than or equal to the predefined minimum, the logic proceeds to a step 304, which populates the search results with a subset listing of the articles, media, titles, etc. from the search content data that have words starting with the characters appearing in the Find dialog box at the time the user pressed the Enter key or selected the Go control in the user interface. The listing will typically also include the three items immediately preceding the closest match to the characters input by the user. Further included will be items containing the word(s) corresponding to the characters input by the user. A step 304 scrolls through the list to the first prefix match (or the closest available near match). A decision step 308 determines if more than three characters exist in the Find dialog box and if so, the logic carries out a full text search in a step 310 to populate the search results pane. If not, the logic proceeds with the step 168 in FIG. 3.

Returning to decision step 302 in FIG. 6, if the count is less than the predefined minimum, a step 312 populates the search results with the entire list of the articles, media, titles, etc. Next, a step 314 scrolls through the list to the first prefix match for the characters input by the user, (or the closest available match). The logic again continues with step 168 in FIG. 3.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method in a computing device having a processor for inputting a search request from a user, the method comprising:
   displaying a text box;
   receiving from the user characters input into the text box such that the characters received from the user are displayed in the text box;
   when a character is received from the user,
   identifying by the processor quick match items that contain a word that begins with characters received so far from the user;
   generating proposed search strategies based on characters received so far from the user; and
   displaying a first list of the identified quick match items and a second list of the generated proposed search strategies wherein the displayed lists are dynamically updated based on the identified quick match items and the generated proposed search strategies as the user enters characters;
   upon receiving from a user a selection of a quick match item that is currently being displayed in the first list, displaying information relating to the selected quick match item;
   upon receiving from the user a selection of a proposed search strategy that is currently being displayed in the second list,
   initiating by the processor a search for items that match the selected proposed search strategy to identify search results of items;
   displaying in a search result pane the identified search results to the user that includes indications of the identified items; and
   upon receiving from the user a selection of an item of the identified search results, accessing by the processor content associated with the selected item; and
   upon receiving from the user an indication to conduct a search based on the characters currently displayed in the text box,
   identifying search results for a search comprising the characters received from the user;
   displaying in a search result pane the identified search results to the user; and
   upon receiving from the user a selection of an item of the identified search results, accessing information associated with the selected item.

2. The method of claim 1 wherein a proposed search strategy that most closely matches the characters received so far from the user is highlighted and the user selects that proposed search strategy by performing an action that selects whatever proposed search strategy is highlighted.

3. The method of claim 1 wherein
   when a number of the received characters are less than a predefined minimum, displaying the second list of proposed search strategies and a list of searchable content scrolled to a prefix in the list that matches the received characters without displaying the list of quick match items; and
   when the number of received characters is not less than a predefined minimum, displaying the second list of proposed search strategies and the first list of quick match items-, the first list of quick match items being scrolled to a prefix in the first list that matches the received characters.

4. The method of claim 1 wherein each proposed search strategy includes a category along with the characters input so far by the user.

5. The method of claim 1 wherein the displayed first list of quick match items and the displayed second list of proposed search strategies are dynamically updated when a predefined interval has elapsed since a character was received.

6. The method of claim 1 wherein the identifying of search results for a search comprising the characters received from the user includes submitting to a search engine the characters received from the user as a search request wherein the search results of the search engine are the identified search results.

7. The method of claim 2 wherein a quick match item that most closely matches the characters received so far from the user is highlighted and the user selects that quick match item by performing an action that selects whatever quick match item is highlighted.

8. A computer-readable storage medium containing instructions for controlling a computing device to input a search request from a user, by a method comprising:
   displaying a text box;
   receiving from the user characters input into the text box such that the characters received from the user are displayed in the text box;
   when a character is received from the user,
   identifying by the computing device quick match items that contain a word that begins with characters received so far from the user;
   generating proposed search strategies based on characters received so far from the user; and
   displaying a first list of the identified quick match items and a second list of the generated proposed search strategies wherein the displayed lists are dynamically updated based on the identified quick match items and the generated proposed search strategies as the user enters characters;
   upon receiving from a user a selection of a quick match item that is currently being displayed in the first list, displaying information relating to the selected quick match item;
   upon receiving from the user a selection of a proposed search strategy that is currently being displayed in the second list,
   initiating by the computing device a search for items that match the selected proposed search strategy to identify search results of items;
   displaying in a search result pane the identified search results to the user that includes indications of the identified items; and upon receiving from the user a selection of an item of the identified search results, accessing by the computing device content associated with the selected item; and upon receiving from the user an indication to conduct a search based on the characters currently displayed in the text box, identifying search results for a search comprising the characters received from the user;

displaying in a search result pane the identified search results to the user; and upon receiving from the user a selection of an item of the identified search results, accessing information associated with the selected item.

9. The computer-readable storage medium of claim 8 wherein a proposed search strategy that most closely matches the characters received so far from the user is highlighted and the user selects that proposed search strategy by performing an action that selects whatever proposed search strategy is highlighted.

10. The computer-readable storage medium of claim 8 wherein a quick match item that most closely matches the characters received so far from the user is highlighted and the user selects that quick match item by performing an action that selects whatever quick match item is highlighted.

11. The computer-readable storage medium of claim 8 wherein
when a number of the received characters are less than a predefined minimum, displaying the list of proposed search strategies and a list of searchable content scrolled to a prefix in the list that matches the received characters without displaying the list of quick match items; and
when the number of received characters is not less than a predefined minimum, displaying the list of proposed search strategies and the list of quick match items, the list of quick match items being scrolled to a prefix in the list that matches the received characters.

12. The computer-readable storage medium of claim 8 wherein each proposed search strategy includes a category along with the characters input so far by the user.

13. The computer-readable storage medium of claim 8 wherein the displayed list of quick match items and the displayed list of proposed search strategies are dynamically updated when a predefined interval has elapsed since a character was received.

14. The computer-readable storage medium of claim 8 wherein the identifying of search results for a search comprising the characters received from the user includes submitting to a search engine the characters received from the user as a search request wherein the search results of the search engine are the identified search results.

15. A computing device for inputting a search request from a user, the computing device comprising:

a memory;

a processor;

a component that displays a text box;

a component that receives from the user characters input into the text box such that the characters received from the user are displayed in the text box;

a component that, when a character is received from the user, identifies quick match items that contain a word that begins with characters received so far from the user;

generates proposed search strategies based on characters received so far from the user; and displays a first list of the identified quick match items and a second list of the generated proposed search strategies wherein the displayed lists are dynamically updated based on the identified quick match items and the generated proposed search strategies as the user enters characters;

a component that, upon receiving from a user a selection of a quick match item that is currently being displayed in the first list, displays information relating to the selected quick match item;

a component that, upon receiving from the user a selection of a proposed search strategy that is currently being displayed in the second list, initiates a search for items that match the selected proposed search strategy to identify search results of items;

displays in a search result pane the identified search results to the user that includes indications of the identified items; and upon receiving from the user a selection of an item of the identified search results, accesses content associated with the selected item; and a component that, upon receiving from the user an indication to conduct a search based on the characters currently displayed in the text box, identifies search results for a search comprising the characters received from the user;

displays in a search result pane the identified search results to the user; and upon receiving from the user a selection of an item of the identified search results, accesses information associated with the selected item wherein the components are stored as computer-executable instructions in the memory for execution by the processor.

16. The computing device of claim 15 wherein each proposed search strategy includes a category along with the characters input so far by the user.

* * * * *